United States Patent
Ben Shalom (10) Patent No.: US 10,647,101 B2
(45) Date of Patent: May 12, 2020

(54) METHOD OF MANUFACTURING A MULTILAYER MATERIAL

(71) Applicant: Palziv Ltd, Emek Hamaayanot (IL)

(72) Inventor: Yosef Ben Shalom, Emek Hamaayanot (IL)

(73) Assignee: Palziv Ltd, Emek Hamaayanot (IL)

( * ) Notice: Subject to any disclaimer, the term of this patent is extended or adjusted under 35 U.S.C. 154(b) by 0 days.

(21) Appl. No.: 15/781,482

(22) PCT Filed: Jan. 17, 2017

(86) PCT No.: PCT/IL2017/050057
§ 371 (c)(1),
(2) Date: Jun. 5, 2018

(87) PCT Pub. No.: WO2017/122214
PCT Pub. Date: Jul. 20, 2017

(65) Prior Publication Data
US 2018/0345642 A1    Dec. 6, 2018

Related U.S. Application Data

(60) Provisional application No. 62/279,769, filed on Jan. 17, 2016.

(51) Int. Cl.
| | |
|---|---|
| *B32B 37/02* | (2006.01) |
| *B32B 5/32* | (2006.01) |
| *B32B 27/06* | (2006.01) |
| *B32B 27/32* | (2006.01) |
| *B32B 7/00* | (2019.01) |
| *B32B 27/00* | (2006.01) |
| *B32B 37/00* | (2006.01) |
| *B32B 5/18* | (2006.01) |

(Continued)

(52) U.S. Cl.
CPC ............... *B32B 37/02* (2013.01); *B32B 5/18* (2013.01); *B32B 5/32* (2013.01); *B32B 7/00* (2013.01); *B32B 27/00* (2013.01); *B32B 27/065* (2013.01); *B32B 27/08* (2013.01); *B32B 27/32* (2013.01); *B32B 37/00* (2013.01); *B32B 37/06* (2013.01); *B32B 37/182* (2013.01); *B32B 38/0004* (2013.01); *B32B 38/1808* (2013.01); *B32B 2250/05* (2013.01); *B32B 2250/242* (2013.01); *B32B 2250/40* (2013.01); *B32B 2266/025* (2013.01); *B32B 2305/022* (2013.01); *B32B 2307/72* (2013.01); *B32B 2309/02* (2013.01); *B32B 2323/043* (2013.01); *B32B 2323/046* (2013.01); *B32B 2419/00* (2013.01); *B32B 2607/00* (2013.01)

(58) Field of Classification Search
None
See application file for complete search history.

(56) References Cited

U.S. PATENT DOCUMENTS

| | | | |
|---|---|---|---|
| 7,064,896 B2* | 6/2006 | Kuwamura | ......... B32B 37/0015 156/160 |
| 2003/0230379 A1* | 12/2003 | Roubik | ............... B32B 37/0015 156/229 |

* cited by examiner

Primary Examiner — Barbara J Musser
(74) Attorney, Agent, or Firm — Mark M. Friedman

(57) ABSTRACT

A multilayer material is disclosed which consists of polyethylene foam sandwiched between two external layers of high-density polyethylene. A two-step manufacturing process for forming such a multilayer material is disclosed, which consists of (1) thermal bonding of a roll stock of PE foam with a roll stock of HDPE/LDPE laminate, followed by cutting into composites, and (2) thermal bonding of two composites to form a multilayer material.

10 Claims, 6 Drawing Sheets

(51) Int. Cl.
*B32B 27/08* (2006.01)
*B32B 38/18* (2006.01)
*B32B 37/06* (2006.01)
*B32B 37/18* (2006.01)
*B32B 38/00* (2006.01)

METHOD OF MANUFACTURING A MULTILAYER MATERIAL

TECHNICAL FIELD

This invention relates to multilayer thermoplastic materials and their manufacture.

BACKGROUND OF INVENTION

In the field of construction, prefabricated sheets are often used to make walls. The sheets may be of a single material, such as plaster or wood, or of a multilayered material, such as paper-backed plasterboard or plywood.

Prefabricated sheets are cut into various shapes to make interlocking male and female components. This is shown for example in U.S. Pat. No. 5,853,313.

SUMMARY OF THE INVENTION

The present invention discloses a multilayer material and a method for its manufacture. The multiple layers have different densities, and, in combination, form a light-weight material, which is compressible in a direction perpendicular to the layers, and whose exterior surfaces are parallel, rigid, and highly resistant to damage.

The invention discloses a multilayer material including oppositely disposed outer layers, at least one intermediate layer in communication with each one of the outer layers, and at least one inner layer in communication with each of the intermediate layers, the inner layers disposed so as to be in communication with each other; where the inner layers provide compressibility in a direction perpendicular to each of the outer layers, and the intermediate layers facilitate thermal bonding between the outer layers and the inner layers.

According to one feature of certain preferred implementations of the multilayered material, each of the outer layers is laminated to a corresponding intermediate layer.

According to a further feature of certain preferred implementations of the multilayered material, the oppositely disposed outer layers are parallel to each other.

According to a further feature of certain preferred implementations of the multilayered material, each of the inner layers has a thickness of between approximately 5 to 100 millimeters.

According to a further feature of certain preferred implementations of the multilayered material, the outer layers are high density polyethylene (HDPE).

According to a further feature of certain preferred implementations of the multilayered material, the intermediate layers are low density polyethylene (LDPE).

According to a further feature of certain preferred implementations of the multilayered material, the inner layers are polyethylene foam.

According to a further feature of certain preferred implementations of the multilayered material, the above polyethylene foam is closed-cell, cross-linked polyethylene foam.

According to a further feature of certain preferred implementations of the multilayered material, the above polyethylene foam has a density of between approximately 10 to 100 kilograms per cubic meter.

The invention discloses a multilayer material including oppositely disposed outer high density polyethylene (HDPE) layers, at least one intermediate low density polyethylene (LDPE) layer in communication with each one of the outer HDPE layers, and at least one inner polyethylene foam layer in communication with each one of the intermediate LDPE layers, the inner polyethylene foam layers disposed so as to be in communication with each other, where the inner polyethylene foam layers provide compressibility in a direction perpendicular to each of the outer HDPE layers, and the intermediate LDPE layers facilitate thermal bonding between the outer HDPE layers and the inner polyethylene foam layers.

The invention also discloses a method of forming a multilayer material, which involves forming three-layer composites, and which includes:
  a. providing a first pre-formed roll comprised of an outer material layer in communication with an intermediate material layer,
  b. providing a second pre-formed roll comprised of an inner material layer,
  c. feeding both pre-formed rolls through rollers;
  d. joining the intermediate material layer of the first pre-formed roll to the inner material layer of the second pre-formed roll so as to form a three-layer material;
  e. cutting the three-layer material into three-layer composites of a pre-determined length;
  f. providing two composites from step e., both having the same orientation;
  g. reversing the orientation of one composite, so that its bowing is in the opposite direction from the bowing of the other composite; and
  h. joining the inner material layers of both composites.

According to one feature of certain preferred implementations of the method, the composites are sheets.

According to a further feature of certain preferred implementations of the method, the composites are joined by thermal bonding.

According to a further feature of certain preferred implementations of the method, the outer material layer is laminated to the intermediate material layer, in the first pre-formed roll.

According to a further feature of certain preferred implementations of the method, the inner material layer of the second pre-formed roll has a thickness of between approximately 5 to 100 millimeters.

According to a further feature of certain preferred implementations of the method, the outer material layer is high density polyethylene (HDPE).

According to a further feature of certain preferred implementations of the method, the intermediate material layer is low density polyethylene (LDPE).

According to a further feature of certain preferred implementations of the method, the inner material layer is polyethylene foam.

According to a further feature of certain preferred implementations of the method, the above polyethylene foam is closed-cell, cross-linked polyethylene foam.

According to a further feature of certain preferred implementations of the method, the above polyethylene foam has a density of between approximately 10 to 100 kilograms per cubic meter.

BRIEF DESCRIPTION OF THE FIGURES

The invention is herein described, by way of example only, with reference to the accompanying drawings, wherein.

DESCRIPTION OF THE PREFERRED EMBODIMENTS

The present invention is a multilayer material and a method for its manufacture. The principles of the present invention may be better understood with reference to the drawings and the accompanying description.

Figure 1A:
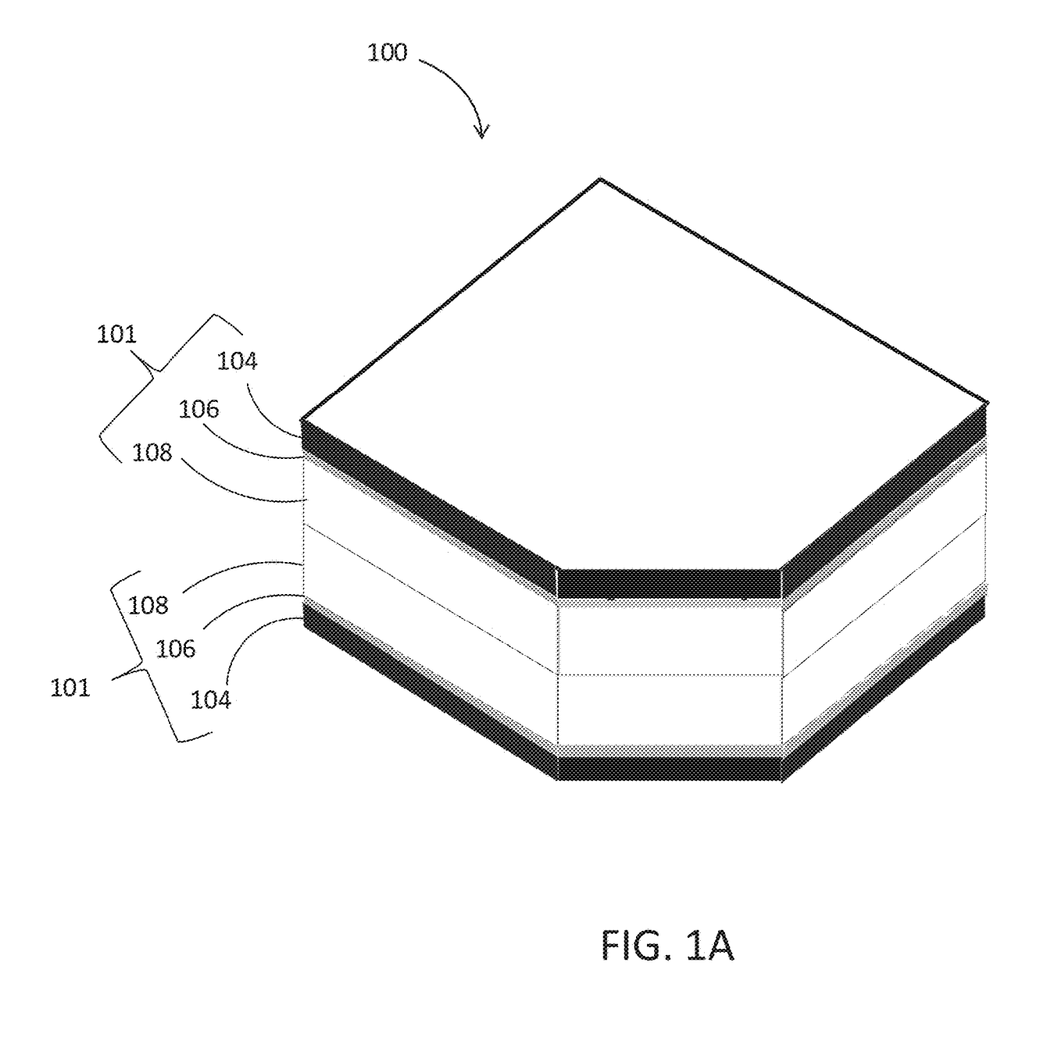
FIG. 1A is a perspective view of an exemplary embodiment of a multilayer material according to the present invention, including a partial cross-sectional view cut from a corner.

FIG. 1A shows article 100, which is an exemplary multilayer material, for example in a sheet form, according to an embodiment of the invention. Article 100 is formed from at least two composites 101, for example, in the form of sheets, each composite 101 including an outer layer 104, an intermediate layer 106 and an inner layer 108. The inner layers 108 of each composite 101 are joined to each other, to form article 100.

Layers 104, 106, and 108 are preferably made of high density polyethylene (hereafter HDPE), low density polyethylene (hereafter LDPE), and closed-cell, cross-linked polyethylene foam (hereafter PE foam). In addition to polyethylene, each of layers 104, 106, and 108 may also include various additives to enhance such properties as flame resistance, resistance to chemicals, ultraviolet resistance, resistance to static charging, scratch resistance, impact resistance, and the like.

One advantage of polyethylene is that it presents fewer health and environmental problems than other thermoplastics such as polyvinyl chloride and polycarbonate. Other advantages include its low weight-to-strength ratio, thermal conductivity, and water absorption.

Exemplary properties of layers 104, 106, and 108 are as follows. The thicknesses of the HDPE and LDPE layers are preferably in the range of 0.1 to 2 mm., and their densities are preferably in the range of 900 to 970 kg/m$^3$. The thickness of the PE foam layer is preferably in the range of 5 to 100 mm., and its density is preferably in the range of 10 to 100 kg/m$^3$.

Figure 1B:
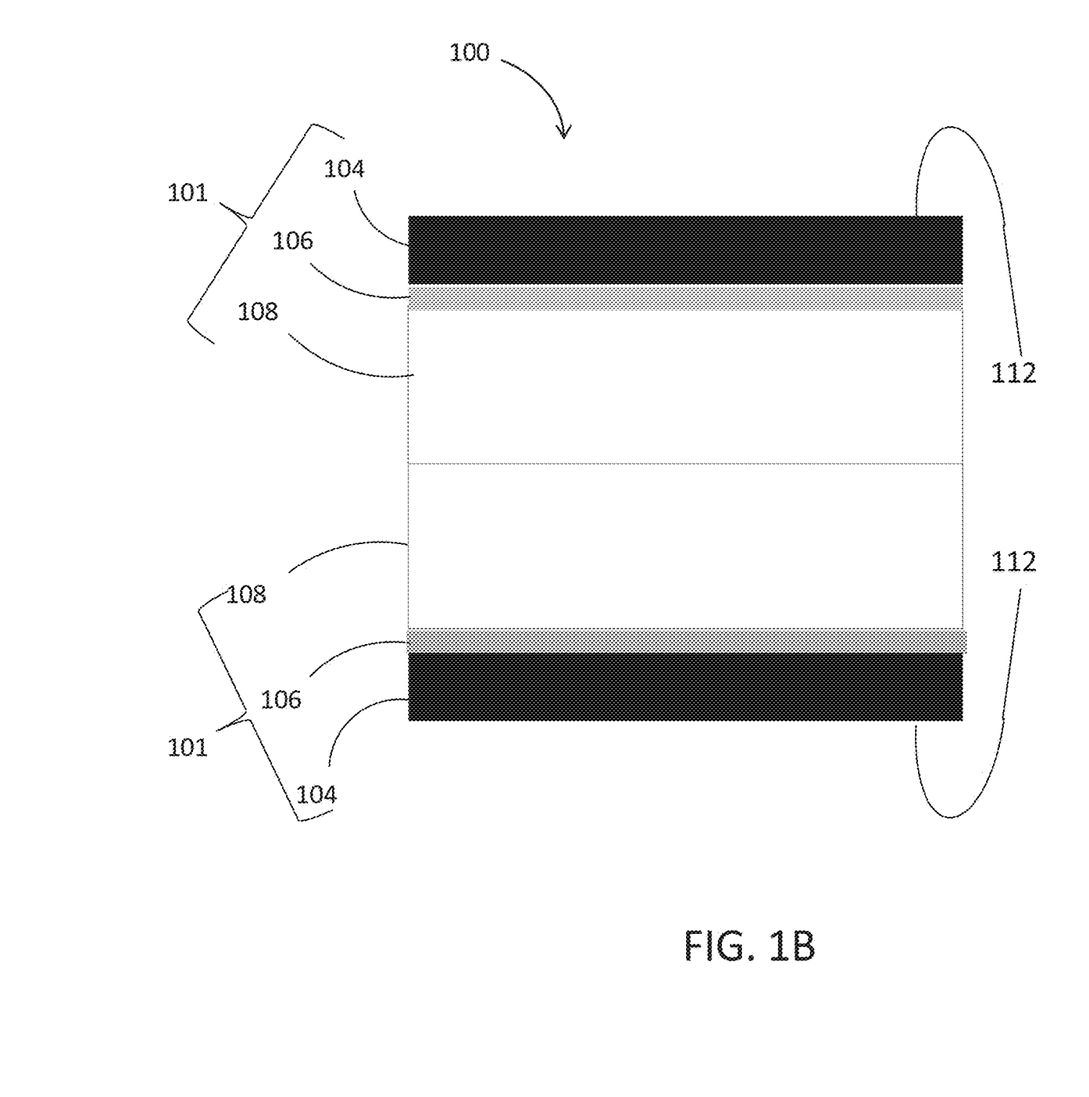
FIG. 1B is an enlarged cross-sectional view of the cross-section of FIG. 1A.

FIG. 1B shows an enlarged cross-sectional view of the cross-section of FIG. 1A. Exterior surfaces 112 may be made highly parallel, typically to within a mechanical tolerance of 1 degree. Furthermore, the highly parallel feature is maintained, even after temporary compression of the PE foam layers by external impact forces.

Figure 2:
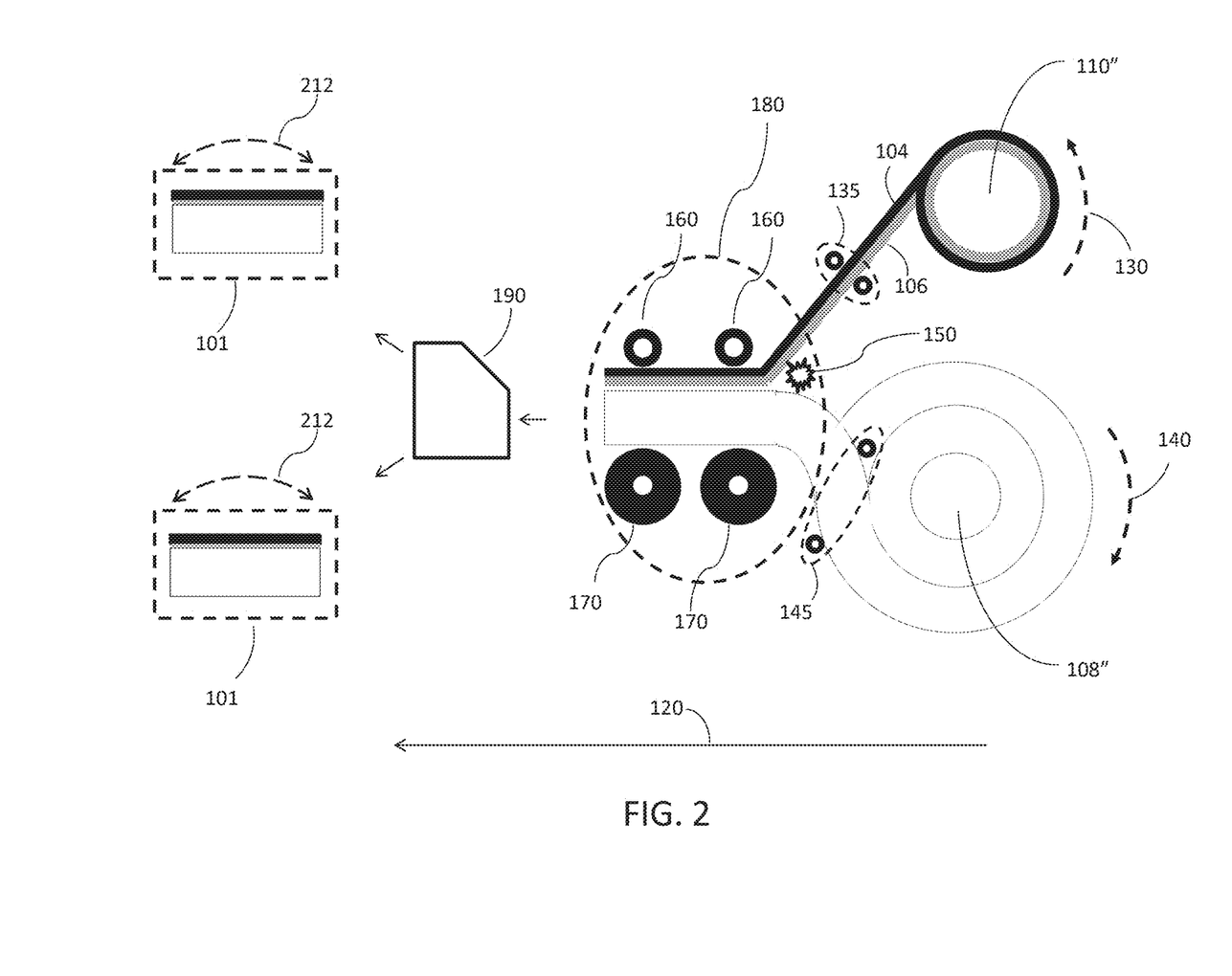
FIG. 2 is a diagram showing the first step of an exemplary two-step manufacturing process for forming the multilayer material of FIGS. 1A and 1B.

FIG. 2 is a diagram of the first step of a two-step manufacturing process for forming the exemplary multilayer material of FIGS. 1A and 1B. Arrow 120 indicates the direction of the process.

Roll stock 108" is a pre-formed cylindrical roll of PE foam 108. Roll stock 108" is available from many manufacturers; for example, Palziv Group Ltd., located at Kibbutz Ein Hanatziv, Israel. Many different varieties are available, in accordance with customer specifications of roll width, color, and PE foam density and cell size.

Roll stock 110" is a pre-formed cylindrical roll of a two-layer laminate, having HDPE layer 104 on one side and LDPE layer 106 on the other. The laminate is bonded together by any of several means, such as co-extrusion, adhesive bonding, thermal lamination, and the like. Roll stock 110" is available from many manufacturers; for example, Polyraz Ltd. located at Kibbutz Maoz Haim, Israel. Many different varieties are available, in accordance with customer specifications of roll width, color, and HDPE/LDPE density and finish.

Roll stocks 110" and 108" are rotated in opposite directions, as indicated by arrows 130 and 140, respectively. The directions of rotation are reversed so that the natural curvatures of the roll stock are opposite to each other, as they enter flame roll laminator 180.

Rotation of roll stocks 110" and 108" is preferably by means of electric motors (not shown). As the radii of the roll stocks decrease, it is necessary to adjust continually the rate of rotation of the electric motors, so as to equalize the linear velocities of the feed stocks entering laminator 180.

Roll stock 110" is mounted as shown in FIG. 2, so that (a) LDPE layer 106 is in closer proximity to heat source 150 than HDPE layer 104, and (b) LDPE layer 106 is brought in proximity to PE foam layer 108.

Tension rollers 135 and 145 feed the roll stocks into laminator 180. During lamination, heat and pressure are applied simultaneously, by means of heat source 150, upper pressure rollers 160, and lower pressure rollers 170. The linear velocity of the feed stock passing through laminator 180 is typically in the range of 1 to 10 meters per minute, and is maintained constant to an accuracy of within 0.01 meters per second.

The temperature of heat source 150 is preferably in the range of 900 to 1100° C., in order to bring the lamination surfaces to a desired softening point for thermal bonding. The softening point of LDPE, as measured for example by the Vicat softening temperature, is at a substantially lower temperature than that of HDPE (e.g. by as much as 30° C.). One of the key reasons for thermally bonding the PE foam layer to LDPE, and not directly to HDPE, is to achieve lamination at lower temperature, and thus to avoid melting the PE foam layer or damaging its closed-cell structure. Another reason for thermally bonding the PE foam layer to LDPE, and not directly to HDPE, is that the bond between PE foam and LDPE appears to be far stronger and more stable than the bond between PE foam and HDPE. This may be a consequence of the chemical structure of LDPE, which has weaker intermolecular forces than HDPE.

Pressure rollers 160 and 170 apply pressure to the feed stock in a direction perpendicular to the plane of translation. The amount of pressure applied is that which is necessary to compress the PE foam layer by about 10%. Applying too low a pressure results in non-uniform lamination; applying too high a pressure may damage the closed-cell structure of the PE foam.

Cutting table 190 is used to cut the output stock into composites 101 of equal length. Typical lengths are in the range of 0.5 to 10 meters. Composites 101 are generally not planar; rather, there is a slight bowing in the direction indicated by curved lines 212. The amount of bowing is slight because the roll stocks have been placed so that the natural curvature of roll stock 110" opposes the natural curvature of roll stock 108".

Figure 3:
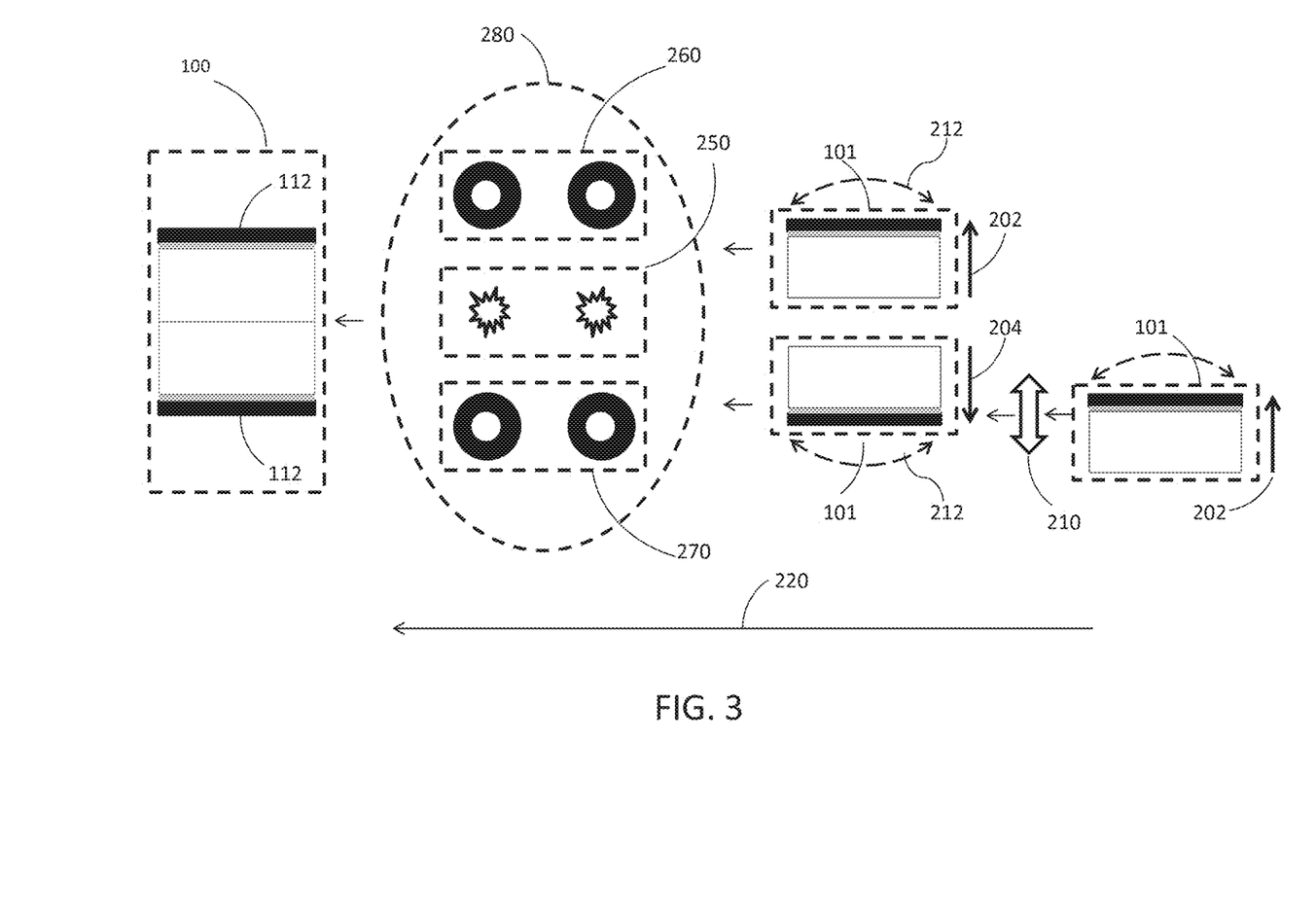
FIG. 3 is a diagram showing the second step of an exemplary two-step manufacturing process for forming the multilayer material of FIGS. 1A and 1B.

FIG. 3 is a diagram of the second step of a two-step manufacturing process for forming the exemplary multilayer material of FIGS. 1A and 1B. Arrow 220 indicates the direction of the process. Arrows 202 indicate the initial orientation of composites 101. Mechanism 210 reverses the orientation of one composite so that it faces in direction 204, which is opposite to direction 202. In this way, after thermal bonding in flame sheet laminator 280, the bowing of one composite cancels out the bowing of the other. It is this cancellation which provides the high degree of parallelism between surfaces 112 of article 100.

The two composites 101 are fed into laminator 280 by means of a conveyor mechanism and input rollers (both not shown). The input rollers are tensioned to keep the feed stock flat and well-aligned. The linear velocity of the feed stock passing into laminator 280 is typically in the range of 0.5 to 5 meters per minute.

Heat and pressure are applied simultaneously inside laminator 280 so as to thermally bond together the PE foam layers of the two composites. The temperature of heat source 250 is preferably in the range of 300 to 350° C., in order to bring the PE foam surfaces to a desired softening point for thermal bonding. Pressure rollers 260 and 270 apply pressure to the composites 101 in a direction perpendicular to their plane of translation. The amount of pressure applied is approximately the same as that used in the first step of the manufacturing process.

After thermal bonding, article 100 is allowed to cool at room temperature (about 25° C.) and is then off-loaded to a storage facility. This completes the second step of the two-step manufacturing process for forming article 100.

Figure 4:
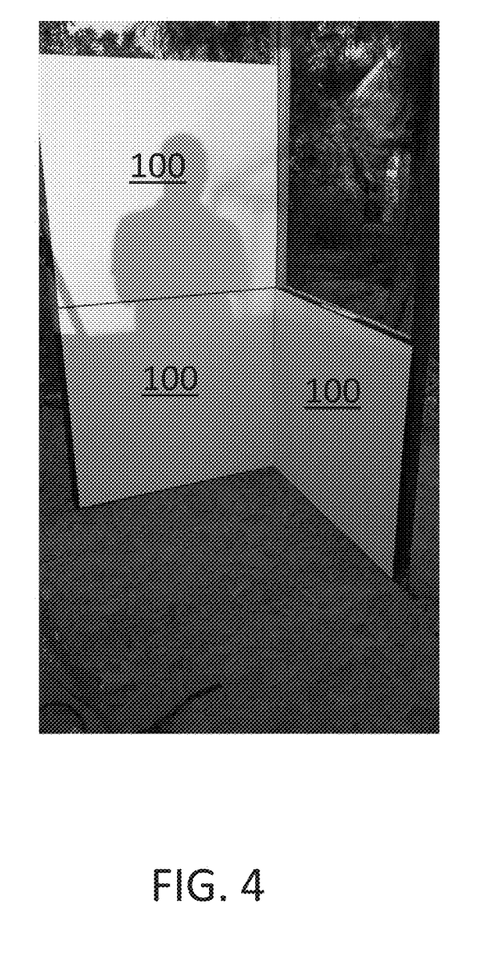
FIGS. 4 and 5 are exemplary applications of a multilayer material according to an embodiment of the invention.
Figure 5:
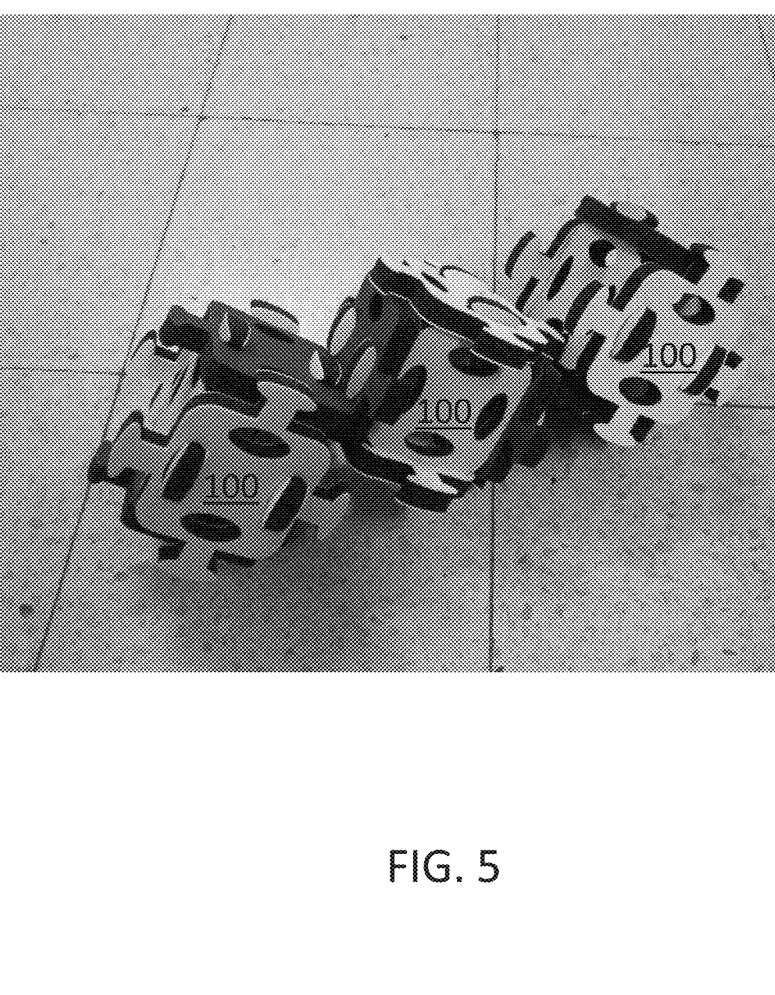

FIGS. 4 and 5 are exemplary applications of a multilayer material according to an embodiment of the invention. In FIG. 4, sheets of article 100 are used to construct the sides of a building. In FIG. 5, sheets of article 100 have been cut into interlocking male and female shapes.

EXAMPLE

| Article 100 | | | |
|---|---|---|---|
| Layer | number of layers | thickness (mm) | density (kg/m$^3$) |
| HDPE | 2 | 1.2 | 950 |
| LDPE | 2 | 0.1 | 920 |
| PE foam | 2 | 10 | 70 |

HDPE Layer 104
Thickness: 1.2 mm
Density: 950 kg/m$^3$
Shore hardness: 68 D
Vicat softening temperature: 123° C.
LDPE Layer 106
Thickness: 0.1 mm
Density: 920 kg/m$^3$

| PE Foam Layer 108 | | | |
|---|---|---|---|
| Property | Standard | Result | Measured unit |
| Thickness | — | 10 | mm |
| Density | ISO 845 | 70 | Kg/m$^3$ |
| Tensile strength - MD* | ISO 1798 | 692 | kPa |
| Tensile strength - TD** | ISO 1798 | 575 | kPa |
| Elongation - MD* | ISO 1798 | 141 | % |
| Elongation - TD** | ISO 1798 | 148 | % |
| Compression 10% | ISO 844 | 80 | kPa |
| Compression 25% | ISO 844 | 105 | kPa |
| Compression 50% | ISO 844 | 191 | kPa |
| Compression Set 25% 0.5 H | ISO 1856 | 6 | % |
| Compression Set 25% 24 H | ISO 1856 | 3 | % |
| Compression Set 50% 0.5 H | ISO 1856 | 17.5 | % |
| Compression Set 50% 24 H | ISO 1856 | 10 | % |
| Working Temperature Range | Internal | −60 \ 90 | ° C. |
| Water Absolution % Vol (max) | Internal | 1 | % |

| PE Foam Layer 108 | | | |
|---|---|---|---|
| Property | Standard | Result | Measured unit |
| Thermal Conductivity at 10 C. | ASTM C177 | 0.0430 | W/mK |
| Thermal Conductivity at 40 C. | ASTM C177 | 0.0470 | W/mK |
| Shore hardness | ASTM D2240 | 29 | A |

*MD—machine direction - along extruder axis
**TD—transverse direction - perpendicular to extruder axis The above parameters are by way of example only, and many variations are possible within the scope of this disclosure.

Formation of article 100 follows the two-step manufacturing process outlined above, to wit: In the first step, a pre-prepared roll of HDPE/LDPE laminate is thermally bonded to a pre-prepared roll of PE foam by means of flame roll laminator 180, and then cut into composites 101. In the second step, a pair of composites 101 is thermally bonded together by means of flame sheet laminator 280, so that the two PE foam layers form an inner core, and the HDPE layers form the outer surfaces.

To those skilled in the art of thermoplastic materials and production processes, it is readily apparent that the principles of this invention may be extended to forming more complex multilayer materials. For example, any number of additional layers of LDPE and PE foam may be inserted between HDPE layers 104 of article 100, using the same thermal bonding techniques and parameters as those outlined above.

Thus, it will be appreciated that the above descriptions are intended only to serve as examples, and that many other embodiments are possible within the scope of the present invention as defined in the appended claims.

The invention claimed is:
1. A method of forming a multilayer material comprising forming three-layer composites, comprising:
   a. providing a first pre-formed roll comprised of an outer material layer in communication with an intermediate material layer;
   b. providing a second pre-formed roll comprised of an inner material layer;
   c. feeding said first and second pre-formed rolls through rollers;
   d. joining said intermediate material layer of said first pre-formed roll to said inner material layer of said second pre-formed roll so as to form a three-layer material;
   e. cutting said three-layer material into three-layer composites of a pre-determined length;
   f. providing a first and a second composite from step e., both composites having the same orientation;
   g. reversing the orientation of said second composite, so that the bowing of said second composite is opposite to the bowing of said first composite; and
   h. joining the inner material layers of said first and second composites.

2. The method of claim 1, wherein said composites include sheets.

3. The method of claim 1, wherein said joining includes thermal bonding.

4. The method of claim 1, wherein said outer material layer is laminated to said intermediate material layer, in said first pre-formed roll.

5. The method of claim 1, wherein said inner material layer of said second pre-formed roll has a thickness of 5 to 100 millimeters.

6. The method of claim 1, wherein said outer material layer is comprised of high density polyethylene (HDPE).

7. The method of claim 1, wherein said intermediate material layer is comprised of low density polyethylene (LDPE).

8. The method of claim 1, wherein said inner material layer is comprised of polyethylene foam.

9. The method of claim 8, wherein said polyethylene foam is closed-cell, cross-linked polyethylene foam.

10. The method of claim 8, wherein said polyethylene foam has a density of 10 to 100 kilograms per cubic meter.

* * * * *